(12) United States Patent
Conan et al.

(10) Patent No.: US 9,942,620 B2
(45) Date of Patent: Apr. 10, 2018

(54) DEVICE AND METHOD FOR REMOTELY CONTROLLING THE RENDERING OF MULTIMEDIA CONTENT

(71) Applicant: ORANGE, Paris (FR)

(72) Inventors: Martin Conan, Cesson Sevigne (FR); Elisabeth Lepoil, Chantepie (FR); Jean-Bernard Leduby, Erquy (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/300,901

(22) PCT Filed: Mar. 31, 2015

(86) PCT No.: PCT/FR2015/050822
§ 371 (c)(1),
(2) Date: Sep. 30, 2016

(87) PCT Pub. No.: WO2015/150685
PCT Pub. Date: Oct. 8, 2015

(65) Prior Publication Data
US 2017/0026714 A1    Jan. 26, 2017

(30) Foreign Application Priority Data
Mar. 31, 2014    (FR) ...................................... 14 52834

(51) Int. Cl.
*H04N 21/6587* (2011.01)
*H04N 21/2343* (2011.01)
(Continued)

(52) U.S. Cl.
CPC .... *H04N 21/6587* (2013.01); *H04N 21/23439* (2013.01); *H04N 21/42204* (2013.01); *H04N 21/43615* (2013.01)

(58) Field of Classification Search
CPC ......... H04N 21/6587; H04N 21/23439; H04N 21/42204; H04N 21/43615;
(Continued)

(56) References Cited

U.S. PATENT DOCUMENTS

2002/0031120 A1    3/2002  Rakib
2003/0046709 A1    3/2003  Kuo-Wen
(Continued)

FOREIGN PATENT DOCUMENTS

CN    203136074 U    8/2013
EP    2704449 A1    3/2014
(Continued)

OTHER PUBLICATIONS

Written Opinion of the International Searching Authority dated Jun. 2, 2015, for corresponding International Application No. PCT/FR2015/050822, filed Mar. 31, 2014.
(Continued)

*Primary Examiner* — Nathan Flynn
*Assistant Examiner* — Cynthia Fogg
(74) *Attorney, Agent, or Firm* — David D. Brush; Westman, Champlin & Koehler, P.A.

(57) ABSTRACT

A method and device for controlling the rendering of digital content that is progressively downloaded on a content server in a wide-area communication network. The content can be accessed via at least one service gateway, and can be downloaded in order to be rendered on at least one rendering device that can communicate with the service gateway and that is equipped with a native remote control device. The method includes: reception, from the rendering device, of a datum relating to a command selected on the native remote control device; generation of a request for the progressive download of digital content associated with the selected command, based on the datum received; transmission of the
(Continued)

progressive download request to the content server via the service gateway.

12 Claims, 3 Drawing Sheets

(51) Int. Cl.
*H04N 21/422* (2011.01)
*H04N 21/436* (2011.01)

(58) Field of Classification Search
CPC ........... H04N 21/4126; H04N 21/6125; H04N 21/4622; H04N 5/4403; H04N 21/44222
USPC .......................................................... 725/37
See application file for complete search history.

(56) References Cited

U.S. PATENT DOCUMENTS

| | | | |
|---|---|---|---|
| 2006/0159109 A1* | 7/2006 | Lamkin | G06F 17/30174 370/401 |
| 2007/0101381 A1 | 5/2007 | Furlong et al. | |
| 2008/0104652 A1† | 5/2008 | Swenson et al. | |
| 2008/0263608 A1 | 10/2008 | White | |
| 2011/0307545 A1* | 12/2011 | Bouazizi | H04N 21/23434 709/203 |
| 2012/0102184 A1* | 4/2012 | Candelore | H04N 21/4728 709/224 |
| 2012/0169482 A1* | 7/2012 | Chen | G08C 17/02 340/12.52 |
| 2012/0311721 A1* | 12/2012 | Chen | H04N 7/1675 726/27 |
| 2015/0007224 A1 | 1/2015 | Cazoulat et al. | |

FOREIGN PATENT DOCUMENTS

| | | |
|---|---|---|
| JP | 2001061110 A | 3/2001 |
| JP | 2005033268 A | 2/2005 |
| JP | 2010263636 A | 11/2010 |
| JP | 2012090136 A | 5/2012 |
| WO | 03088654 A2 | 10/2003 |
| WO | 2013082333 A1 | 6/2013 |
| WO | 2013093310 A1 | 6/2013 |

OTHER PUBLICATIONS

International Search Report dated Jun. 2, 2015, for corresponding International Application No. PCT/FR2015/050822, filed Mar. 31, 2015.
English translation of the Written Opinion of the International Searching Authority dated Jun. 2, 2015, for corresponding International Application No. PCT/FR2015/050822, filed Mar. 31, 2014.

\* cited by examiner
† cited by third party

DEVICE AND METHOD FOR REMOTELY CONTROLLING THE RENDERING OF MULTIMEDIA CONTENT

CROSS-REFERENCE TO RELATED APPLICATIONS

This Application is a Section 371 National Stage Application of International Application No. PCT/FR2015/050822, filed Mar. 31, 2015, the content of which is incorporated herein by reference in its entirety, and published as WO 2015/150685 on Oct. 8, 2015, not in English.

TECHNICAL FIELD

The invention relates to playing back a digital multimedia content on a device that has a playback function, referred to as a "playback" device, or more simply as a TV.

The invention applies more particularly to remotely controlling the playback on the playback device of digital contents coming from a wide area communication network by using a remote control device that is natively associated with that playback device.

STATE OF THE ART

With the development of networks and of terminals, it is now commonplace to play back multimedia contents (video, audio, etc.) on any user device, e.g. on a TV or on a digital tablet, with the content coming from the Internet network. The term "digital content" is used to mean films, videos, or more generally any type of digital multimedia content that can be transmitted in the Internet network in question. Contents are also said to be "streamed" to indicate that they are received by continuous downloading from the Internet network and can be played back in real time on a user terminal. In order to receive the digital content, the terminal generally sends a request to a server that is to be found in the wide area network, by specifying an address for the desired content, and in return it receives a digital data stream relating to that content.

At the playback device, playback consists in delivering the digital content in a form that is accessible to the user. For example, received data corresponding to a digital video is generally decoded and then the corresponding video together with its associated soundtrack is played back in the form of a viewable display.

The playback device, in particular if it is a TV, is generally supplied to a user with a remote control device, referred to below as the "native" remote control, that is designed to control the playback of contents coming from a broadcast network, e.g. of the digital video broadcast (DVB) type covering a set of digital TV standards broadcast by cable, by satellite, or by radio network. It is assumed herein that this category of broadcast contents also includes contents of DVB-IP type, also known as IPTV, i.e. the broadcasting of digital TV or the supply of contents over the Internet network under the control of a service operator.

In order to demultiplex and decode broadcast programs, such a TV is conventionally connected to a digital decoder, commonly referred to as a set top box (STB). Alternatively, the digital decoder may be incorporated in the TV. The native remote control is thus the remote control of the TV, or the remote control of the STB.

A TV may also be designed to access content that is streamed on the wide area network (WAN), as contrasted to a local area network (LAN). Under such circumstances, the TV is said to be "connected", i.e. the TV may be connected to the Internet in order to deliver a set of enriched services to users. If playback does not take place under the control of a service operator, it is also said that the content is of the over-the-top (OTT) type. OTT TV enables the user of a TV that is connected to the Internet to play back digital channels or web content on the TV.

In general, that type of "connected" TV can be interfaced with the user's local network and thereby access a content server in the WAN.

If the TV is not connected, it is common practice to connect it to another terminal, e.g. a personal computer (PC) or a specific module (e.g. in the form of an electronic key) in order to access contents streamed from the Internet and to transmit them to the TV, in particular via its high definition multimedia interface (HDMI), i.e. a digital communication interface suitable for transmitting non-compressed audio and video signals at high definition, and as standardized by the HDMI forum.

Whether or not the TV is connected, its native remote control does not make it possible to control programs that are received by being progressively downloaded from the Internet network. Specifically, an action on the remote control (e.g. pressing on the "2" button) serves to switch over to channel two of a broadcast network (DVB, DVB-IP), but does not give access to the content (e.g. channel number 2) on the content server used for progressive downloading.

If a user seeks to access contents by progressive downloading, the user must therefore make use of a specific menu or remote control associated with Internet contents.

For example, it is known to use a smartphone or a digital tablet to select Internet programs for playing on the TV, whether or not the TV is of the connected type.

Nevertheless, in comparison with that type of remote control, the native remote control (of the TV or of the STB) possesses the advantages of simplicity and of availability.

At present, it is not possible to use a native remote control for controlling both the reception of programs received conventionally via the broadcast network (DVB or TVIP) and for receiving programs that are progressively downloaded from the wide area Internet network.

The invention provides a solution that does not present the drawbacks of the state of the art.

THE INVENTION

To this end, in a functional aspect, the invention provides a method of controlling the playback of a digital content available for progressive downloading from a content server in a wide area communication network, said content being accessible via at least one service gateway and being capable of being downloaded to be played back on at least one playback device suitable for communicating with the service gateway and having a native remote control device, the method being characterized in that it comprises the following steps:

receiving, from the playback device, data relating to a command selected on the native remote control device;
  on the basis of the received data, generating a request for progressively downloading a digital content associated with the selected command; and
  sending the progressive downloading request to the content server via the service gateway.

Thus, the invention provides the advantage of being able to use the native remote control of the TV (or of the STB if the TV is connected to such a device) in order to issue progressive downloading commands to the content server, e.g. in order to switch to the next content (film, music, episode in a series, etc.), change soundtrack, add a subtitle track, etc. The received command is transmitted by the TV to a control device that is situated in the local network controlled by the service gateway, or that is situated directly in the service gateway, and that then performs conversion of the received command to a command that is understandable for progressive downloading, e.g. the address of the content on the content server, in the form of an HTTP type address (URL) together with the associated parameters.

In a particular implementation of the invention, the playback control method is further characterized in that it includes a step of putting the playback device into a progressive download mode, and in that the progressive downloading request is generated and sent only if the playback device is put into this mode.

In this embodiment, an input in the progressive downloading mode conditions subsequent generation of a progressive downloading command. Specifically, if the TV is in a mode for receiving and playing back programs coming from DVB, there is no point in generating a progressive downloading command, since that is meaningful only when the TV is already in the progressive downloading mode. The switchover to this mode occurs in particular by control of the TV being taken over by a streaming device, e.g. the service gateway or a device of the electronic key, PC, etc. type that is connected thereto via the HDMI port.

In a second particular implementation of the invention, that may be implemented as an alternative or together with the above implementations, the method is also characterized in that the step of generating a request for progressively downloading a digital content includes a sub-step of putting the received data into correspondence with the progressive downloading request that is to be generated.

This implementation makes it possible in particular to transcribe a proprietary request received from the native remote control into a "universal" streaming command. Specifically, an action on the remote control of a playback device (e.g. "P+") may be translated differently (using commands having different binary codes) depending on the type or the brand of such a TV. This implementation invention makes it possible to ignore this problem by making use of simple correspondence (e.g. a conversion table in memory that is accessible from the control device) for the purpose of translating a given command (e.g. the binary code "001") from a given playback device (e.g. "S") into a command that can be understood when streaming (e.g.: "switch to the next program up").

This correspondence table may depend on the type of interface used for receiving the command order and subsequently for transmitting it to the device controlling playback: it may involve using the WiFi module of the connected TV to transmit the command to the control device, which is located for example in the service gateway. It should be recalled that the term "WiFi" (for Wireless Fidelity) covers wireless transmission technologies enabling wireless computer networks to be created that are based on standards of the IEEE 802.11 family. Advantageously, if the command is transmitted directly from the TV over an HDMI connection to a device (HDMI key, PC, etc.) that is connected to the TV, such a step of putting into correspondence makes it possible in particular to be unaffected by the proprietary nature of the information that is conveyed using the HDMI-CEC standard. It should be recalled that HDMI type connections are provided most particularly for conveying digital contents including the image and the sound at a high data rate (in high-definition) and in reliable manner. Such connections are nowadays very widespread and present on most video terminals on the market (TVs, DVD readers, computers, etc.). Advantageously, use is made of the HDMI-CEC specification (where CEC stands for consumer electronics control). One of the pins of the HDMI interface is then dedicated to a set of inter-device control functions. When it is implemented by the manufacturer, the CEC specification enables a wide variety of control functions to be performed on connected pieces of equipment and in particular, when the connected devices are compatible, it enables bidirectional communication to be set up between them and strings of different commands to be sent (play the content, fast forward, pause, mute, switch to the next program up, change program, etc.). Given that HDMI-CEC commands depend to a large extent on manufacturers, a correspondence table of the kind proposed makes it possible not to be tied to any one set of commands.

In a third particular implementation of the invention, that may be implemented as an alternative or together with the above implementations, a method as described above is also characterized in that the step of generating a request for progressively downloading a digital content includes a sub-step of analyzing a description file of a digital content.

This description file may be a computer file or a dataset that is descriptive of the content that is accessible at a certain address on a content server. In particular, it enables the client terminal to access the content on a server, by means of its address. Analysing such a description file enables the control device to take the desired command and determine therefrom the address of the requested content.

In a fourth particular implementation of the invention, that may be implemented as an alternative or together with the above implementations, a method as described above is also characterized in that, when generating a progressive downloading request, a quality of service level is requested.

This implementation of the invention gives access to content in HTTP adaptive streaming (HAS) mode. In the context of progressive downloading, and for the purpose of exchanging data between the client terminal and the server, recourse is often had to a technique of the type known as "adaptive streaming". In particular, this type of technique enables good quality to be made available to the user, e.g. while taking account of variations in bandwidth on the connection between the client terminal (the TV in this example) and the content server. There exist various solutions that are well known to the person skilled in the art for facilitating making such content available in progressive downloading and for distributing it, e.g. such as the proprietary solutions Microsoft smooth streaming (MSS) and Apple HTTP live streaming (HLS), or indeed the MPEG DASH standard (for dynamic adaptive streaming over HTTP-ISO/IEC standard 23009-1:2012 (E)), a standard of the ISO/IEC organization dedicated to streaming multimedia contents on the Internet, to which particular attention is given below in the present description.

In a fifth particular implementation of the invention, that may be implemented as an alternative or together with the above implementations, a method as described above is characterized in that it further includes the following steps:
  in a given time period, receiving data relating to a second command relating to a digital content and coming from a remote control device distinct from the native remote control device;
  giving priority to one of the commands; and
  adapting the generated progressive downloading request in order to take account of this priority.

Advantageously in this implementation, higher priority may be given to one or the other of the remote controls: the native remote control of the TV may be considered as having higher priority for selecting a content. Thus, if the native remote control requests the preceding program and the secondary remote control (e.g. a smartphone) requests the program following the current program, then the method of the invention is capable of selecting one or the other of the commands for formatting and transmitting to the content server, to the detriment of the other command. The period of time during which priority is left to the native remote control may for example be 3 seconds: after that time has elapsed, an alternative remote control, e.g. a mobile device, may take over remote control and impose its selection of a content.

In a hardware aspect, the invention also provides a device for controlling the playback of a digital content available for progressive downloading from a content server in a wide area communication network, said content being accessible via at least one service gateway and being capable of being downloaded to be played back on at least one playback device suitable for communicating with the service gateway and having a native remote control device, the playback control device being characterized in that it comprises:

- a receive module for receiving from the playback device data relating to a command selected on the native remote control device;
- a module for acting on the basis of the received data, to generate a request for progressively downloading a digital content associated with the selected command; and
- a send module for sending the progressive downloading request to the content server via the service gateway.

The term "module" may correspond equally well to a software component or to a hardware component or to a set of hardware and software components, a software component itself corresponding to one or more computer programs or subprograms, or more generally to any program element suitable for performing a function or a set of functions as described for the modules in question. In the same manner, a hardware component corresponds to any element of a hardware assembly suitable for performing a function or a set of functions for the module in question (integrated circuit, IC card, memory card, etc.).

In another hardware aspect, the invention also provides a playback control device as claimed above, characterized in that the receive module includes an IP type communication interface.

In another hardware aspect, the invention also provides a control device as claimed above, characterized in that the receive module includes an HDMI type communication interface.

In another hardware aspect, the invention also provides a service gateway including a playback control device with an IP type communication interface as described above.

In another hardware aspect, the invention also provides a connected TV including a playback control device with an IP or HDMI type communication interface as described above.

In another hardware aspect, the invention also provides an electronic key including a playback control device with an HDMI type communication interface as described above.

In another hardware aspect, the invention also provides a system comprising a connected TV having a native remote control and a service gateway as claimed above.

In another hardware aspect, the invention also provides a system comprising a TV having a native remote control, a service gateway, a secondary remote control, and an electronic key as claimed above.

In another hardware aspect, the invention also provides a computer program suitable for being used to perform at the above-defined control method, the program including code instructions that perform the steps of the transfer method when the program is executed by a processor.

In yet another hardware aspect, the invention relates to a processor-readable data storage medium storing a program including program code instructions for executing steps of any of the above-defined control methods.

These devices, this computer program, and this data medium, all present characteristics and advantages analogous to those described above with reference to the control method.

The invention can be better understood on reading the following description, which is given by way of example and made with reference to the accompanying drawings.

DETAILED DESCRIPTION OF AN IMPLEMENTATION ILLUSTRATING THE INVENTION

Figure 1:
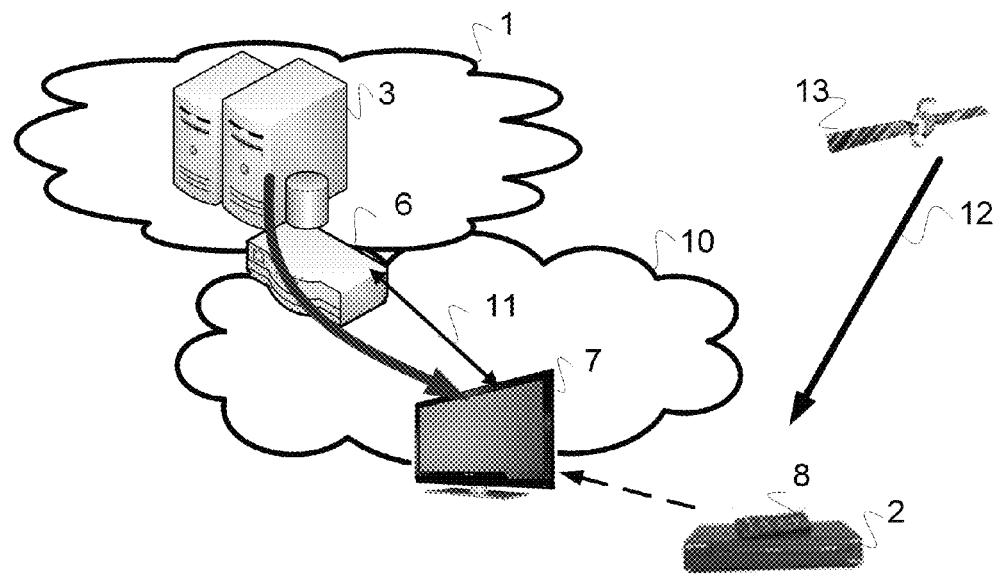
FIG. 1 shows a playback device associated with a native remote control device in a local network together with a service gateway hosting a control module in a first embodiment of the invention.

The local network (10) of the user (not shown) is connected to the wide area network (WAN, 1) via a service gateway (6). The local network (10) includes a user playback device (7), or more simply a TV. In this embodiment, the TV is of the connected type, i.e. it has a WiFi communication module and forms one of the terminals in the local network that are connected to the service gateway (6).

It should be recalled at this point that a local network, also referred to as a home network, is a computer network that connects together in wired or wireless manner the terminals in a home (computers, print peripherals, playback peripherals, storage peripherals, etc.) that are suitable for communicating with one another. A home network generally also includes router equipment, also commonly referred to as a home gateway or a service gateway, that constitutes an intermediate element serving to redirect or "route" data packets between the various terminals and the networks that are connected thereto. Such a home network often connects the various terminals by using WiFi wireless technology or Ethernet wired technology, both of which types of media are designed for communication based on protocols of the Internet protocol (IP) family, which protocol constitutes the base for Internet type networks, and by extension is used as the name of the network itself. To this end, the service gateway includes a WiFi communication function or WiFi access point (AP) that enables it to communicate wirelessly with the terminals of the network. This access point includes a bidirectional radio module for transmitting or receiving signals in the local network.

The context of the home local network (10) is given by way of example and can easily be transposed to the context of a business network.

The terminals of the local network are suitable for setting up connections with the service gateway (6), which is also connected to a wide area communication network (1) via a broadband connection. By way of example, the network (10) is a local IP network and the broadband connection is of the asymmetric digital subscriber line (ADSL) type. The wide area network (1, WAN) in this example is also of the IP type and contains a multimedia content server (3) that serves in particular to host digital contents for making available to the terminals of the local network (10) in streaming mode. The content server (3) in this example is in the WAN (1), but in another example it could be situated in a local network, e.g. in the service gateway (6) or in any other piece of equipment capable of hosting such a content server.

Below, the term "terminal device", or more simply "terminal", is used to designate any device suitable for connecting to the gateway (6), such as a computer or a television type device (TV), a personal computer (PC), a smartphone, a personal digital assistant (PDA), or more generally any device suitable for communicating with the service gateway in wired or wireless manner.

The TV (7) is typically also connected to a broadcast digital network of the digital video broadcast (DVB) type, which covers a set of digital TV standards set out by the European DVB consortium. The underlying infrastructure may be based on a satellite (13), or on digital terrestrial television (DTTV), or indeed on cable (not shown). Alternatively, or in additional manner, the TV (7) could also be connected to a network of the DVB-IP type, also known as IPTV, i.e. serving to broadcast digital television or provide contents, e.g. video on demand (VOD) from the Internet network under the control of a service operator ensuring delivery quality (e.g. a TV from an operator, associated with a digital decoder and with a home gateway from the same operator). Various broadcast programs can thus be shared among different transport streams, also referred to as a multiplex (12). Multiplexes are received by digital decoders, also known as set top boxes (STB, 2) via appropriate reception media (antennas, cables, ADSL, etc.) and the various programs making them up are demultiplexed and decoded prior to being played back by the TV connected to the STB. Alternatively, the decoder may be incorporated in the TV (nowadays most TVs are fitted with digital decoders for digital terrestrial TV (DTTV)). The decoder and/or the TV is/are conventionally provided with a native remote control (8) for controlling the broadcast contents by browsing in the menu of the decoder. The remote control has various browsing keys for interacting with the decoder. Alternatively, the remote control has a touch screen. It communicates in unidirectional manner with the decoder or the TV, e.g. over an infrared link, and it transmits simple commands as a function of the keys pressed by the user on the interface, or as a function of commands input via a touch screen of the remote control.

The TV (7), which is of the connected type in this embodiment, is capable of direct IP communication (WiFi) with the service gateway (6). In a variant, it is connected via its HDMI port to an external device, such as for example the service gateway (6), depending on the embodiment. In another example, the HDMI connection may connect it to an STB type device, which is itself connected to the broadcast network or to the Internet network. In yet another example, the TV is connected via its HDMI port or by WiFi to a PC that is connected to the user's local network. In yet another example, and as described below with reference to FIG. 2, the TV is connected via its HDMI port to an electronic key that is capable of making a connection with the user's local network.

In this context, it may be assumed that the TV can use a suitable display to make available a program guide or list of contents available in streaming from the content server (3). The user selects to receive a streamed content, e.g. a channel referred to as CH1. The service gateway (6) connects to the content server (3) of the WAN (1) from which it recovers the streamed contents.

In FIG. 1, the curved arrow represents the path followed by the content from the content server (3) to the TV (7), passing via the service gateway (6).

In this reception context, a problem that the invention solves is as follows: acting on a key of the native remote control, e.g. "P+", does not lead to a change in the program being received by the TV, since the remote control is not designed to control the streaming of contents from the Internet network.

In this embodiment, a module referred to as the "control" module and hosting a "control" method of the invention has previously been installed on the home gateway. This control module receives as input the basic command (e.g. "P+") from the native remote control (8) of the TV, and it transforms it into a streaming order, i.e. it generates a downloading address for the content server (3).

In order to access a multimedia content in streaming from an Internet type network, the client terminal generally makes a request in two steps: a first step consists in downloading a document describing the parameters for accessing the service via the hypertext transport protocol (HTTP), which is a client-server communication protocol developed for Internet networks and in particular for the web. That document may be a computer file or a dataset describing the content that is accessible at a certain address on a content server. Below, this is referred to as a "description file". In a second step, the client terminal accesses the content on the server and the service actually begins, i.e. the client terminal can receive and display the content. In this context of the HTTP protocol, it often happens that in order to exchange data between the client terminal and the server, recourse is had to a technique of the HTTP adaptive streaming (HAS) type. In HAS, it is conventional for a single video to be encoded or transcoded as several different streams, e.g. corresponding to different data rates, different resolutions, or different qualities.

Several solutions exist for making such content available in streaming and for distributing it, including the MPEG DASH standard.

An example of such a description file, and specifically a manifest file (.mpd) inspired on the MPEG-DASH standard, is given in Appendix 1. This simplified manifest file describes digital contents using extended markup language (XML) syntax, comprising a list of contents in the form of fragments that are conventionally described between an opening tag (<SegmentList>) and a closing tab </SegmentList>. Each fragment corresponds to a certain duration ("duration" field) with a plurality of quality levels (subdividing into fragments makes it possible in particular to adapt finely to fluctuations in bandwidth) and serves to generate their addresses in the form of uniform resource locators (URLs). In this example, this generation is performed using a "BaseURL" element (http://server.com) specifying the address of the content server (3) and a "SegmentURL" element, which lists the additional address portions for the various fragments:

"CH1_FR/C1_500kb_1.m4s" for the first fragment of the content "C1" at 500 kilobits per second ("kb"), in the MPEG-4 ("m4s") format, and in French ("_FR");
"CH1_FR/C1_500kb_2.m4s" for the second fragment;
etc.

It should be observed that this downloading takes place conventionally via an HTTP URL as described above, but could equally well take place via a universal resource identifier (URI) describing some other protocol (e.g. dvb://mycontentsegmentC1).

Once these address fragments are available to the control module of the invention, it can proceed to obtain multimedia content fragments by downloading from these addresses. For example, the complete address corresponding to the content C1 on CH1 is of the type:

http://server.com/CH1_FR/C1_500kb_1.m4s

The control module can use this file to access a content that is described in streaming.

Knowing a first content that is being streamed (C1 on CH1), the control module can analyze this type of description file also to access the fragments of a second content, i.e. either on the same channel (C2 on CH1), or on another channel (CH2), etc.

In the context of this implementation, the role of the control module is thus to receive the change program order ("P+") from the TV, and then, by way of example, select in the description file the appropriate content (the program CH2 that follows the current program CH1) at the data rate appropriate for the TV, and finally issue a streaming order to the content server (3) so as to recover the program CH2 and deliver it to the TV.

Alternatively, the presently-described control module is to be found in the connected TV itself, or in any other piece of equipment of the local network.

Figure 2:
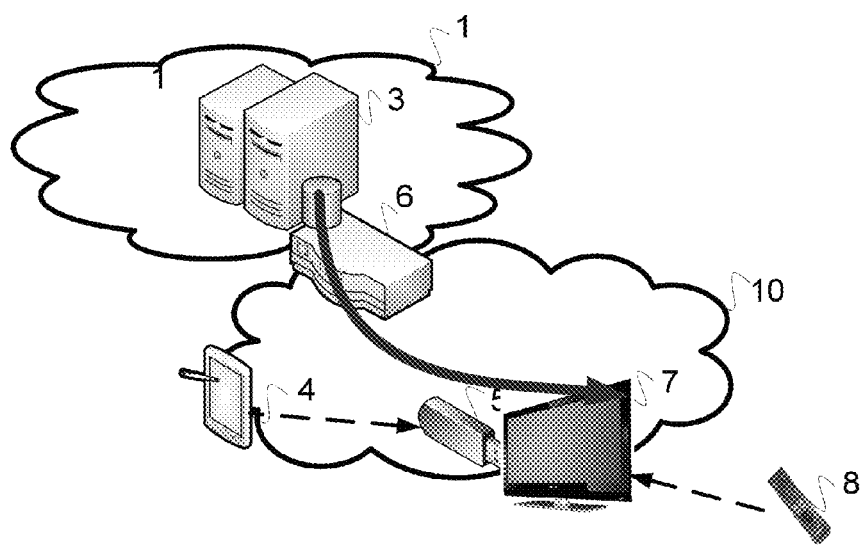
FIG. 2 shows a playback device associated with a native remote control device in a local network together with an electronic key ("dongle") hosting a control module, in a second embodiment of the invention.

There follows a description of a second embodiment of the invention given with reference to FIG. 2, which shows a playback device associated with a native remote control device in a local network and an electronic key ("dongle") hosting a streamer and a control module of the invention, the key being connected to the HDMI port of the TV.

In this embodiment, a local network (10) controlled by a service gateway (6) comprises a mobile device (4) and a transfer device (5) that is in the form of an electronic key. In this embodiment, the service gateway (6) is a service gateway (6) that serves to route data in the local network (10) and between the local network (10) and the WAN (1) in which the content server (3) is to be found. By way of example, the service gateway (6) is a piece of router equipment known under the trade name Livebox©. In this example, the mobile device (4) is also connectable to a mobile network that is not shown. The mobile network is a mobile cell phone radio network, e.g. of the third generation (3G, e.g. in compliance with the universal mobile telecommunications system (UMTS) standard that is well known to the person skilled in the art), or indeed of the fourth generation ((4G, e.g. in compliance with the long term evolution (LTE) standard), etc.

The context of this embodiment is that of mobile TV, which is initially received on a user's mobile device, and in the example of FIG. 2 on the user's smartphone (4) or digital tablet. In certain situations, and in particular when the user of the mobile device is at home, the user finds it more agreeable for the multimedia content, e.g. a film, to be played back on a TV having a screen that is larger than that of the mobile device. A user of the local network in this embodiment thus possesses at least two devices, both a mobile device (4) and a playback device (7), specifically a TV. The user thus makes use of the screen of the playback device (7) to play back content that has previously been selected on the mobile device: by using an application on the mobile device, specifically a TV application previously supplied to the user by the network and/or service operator, with the user selecting a multimedia content (audio, video, etc.) available on a content server (3) for playing back on the TV (7) associated with the transfer peripheral (5) that is connected in this example to the HDMI video port of the user's TV (7), which device is in the form of an electronic key.

In this example, the contents are "live" contents, i.e. for delivery in real time to clients of the operator, or to users of the local network. By way of example, this might be a streamed television channel.

It is assumed that both pieces of equipment (the mobile terminal and the key) are connected to the local network (10) and are suitable for communicating with each other. In order to dialog about the session set up between the mobile device and the key, it is possible in conventional manner to use an HTTP type application protocol in association with the websocket (WS) protocol that serves to provide bidirectional communication between the client and the HTTP server, specifically the mobile device and the transfer device.

The transfer device takes control of the TV and possibly displays a menu corresponding to the contents that are available on the streaming server. This control places the playback device in a "progressive downloading" mode, as contrasted to the native DVB mode of the TV.

Once the transfer device (5) is connected to the local network via the service gateway, and once it has taken control of the TV via the HDMI connection, a content may be selected and transferred to the TV (7). An application running on the mobile device (4) enables the user to select a multimedia content, and then after selecting a function of the mobile terminal (activating a key, a button, a touch screen, a voice command, etc.), the request to access the multimedia content is redirected to the transfer device that hosts the control module in this embodiment. The control device transforms the identifiers of the content into an address that is valid for the content server (3) of the WAN (1) to which it makes a connection, and from which it recovers the content (CH1), preferably with quality or resolution that is higher than that of the initial quality or resolution of the mobile device, and without passing via the mobile device. The content may be recovered in streaming from the server (3) of the WAN using MPEG-DASH (as described above with reference to FIG. 1 on the basis of the simplified XML file example of Appendix 1) and it may be played back on the screen of the TV (7). The curved arrow in FIG. 2 symbolises the path followed by the digital content.

If the user seeks to change program while viewing channel 1 (CH1) in streaming, two solutions are made available to the user in the context of this embodiment of the invention: either the user makes a selection using the mobile device as a remote control, or else the user makes a selection using the native remote control. In both situations, the module of the invention then takes charge of converting the received order into a streaming request:

When coming from the native remote control via the HDMI port: as before, the order coming from the TV is received by the key via the HDMI port and the HDMI-CEC protocol. It is important to observe at this point that the HDMI-CEC protocol does not standardize the format of the binary string, which is itself encapsulated in the messages (which messages are themselves standardized). In order to be able to adapt to the proprietary conventions of each manufacturer, the invention makes it possible to define a conversion or correspondence table between the data received from the remote control and the streaming request that is to be generated for sending to the control module. It serves as an interface with the various models of TV available on the market and thus makes it possible to be unaffected by their particular features. An example of such a table is given below:

The first column gives the command that has been selected on the native remote control ("P+", "P−", "CHX", etc.) and transmitted to the TV, e.g. over an infrared link, and then forwarded by the TV over the HDMI connection using a binary code encapsulated in an HDMI-CEC message.

The second column gives the name of the model, manufacturer, etc.

The third column gives the binary code said manufacturer associates with the command: "P+" is represented by the code "0010" by manufacturer S, and by the code "0011" by manufacturer Q.

The fourth column gives the output order to be delivered to the playback control device ("Program up" for "P+").

| Receive command | Brand/type of TV | HDMI-CEC binary string | Command for the control module |
|---|---|---|---|
| P+ | S | 0010 | Program up |
| P+ | Q | 0011 | Program up |
| CH2 | S | 010010 | Channel 2 |

Thereafter, the output order is acquired by the control device for analyzing a description file, e.g. the file given in Appendix 1, in order to determine which address to select: if the next program up is required, the control device, which knows which content is currently being played back (CH1), can analyse the description file in order to decide that the following content is the content CH2 (using any analysis method available to the person skilled in the art) and can read the corresponding address from the description file, e.g. the address:

http://server.com/CH1_FR/C1_500kb_1.m4s

Coming from the secondary remote control (mobile device) via the local network to which both the mobile device and the key are connected: the key (5) is capable of receiving basic commands transmitted by the mobile application over the IP link, such as for example:
"ON", "OFF" for switching the TV on/off;
"V+", "V−", "mute" for increasing or reducing volume or for muting;
"tuner_channel_command": for direct channel selection (CH1, CH2, etc.) for restoring when downloading control mode has come to an end and the TV has returned to "satellite" mode;
etc.

In the event of conflict, the HDMI key also gives priority to one or the other of the remote controls. Preferably, greater priority is given to the native remote control.

This implementation is described in greater detail with reference to FIG. 6.

Figure 3:
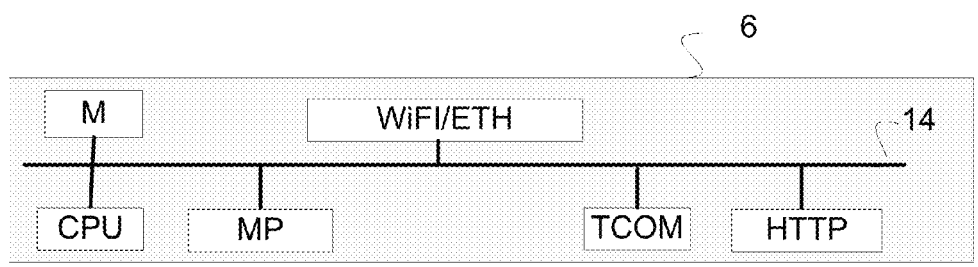
FIG. 3 shows the hardware architecture of a service gateway incorporating a control device in an embodiment of the invention.

FIG. 3 shows the hardware architecture of a device hosting a control module in a first embodiment of the invention, e.g. the digital gateway (6).

In conventional manner, the device comprises memories (M) arranged around a central processor unit (CPU). The memories may be of the read only memory (ROM) type or of the random access memory (RAM) type, and they may be removable or hard-wired, etc. They communicate with the local network (1) via the communication module (WiFi/ETH) that enables them to make wired or wireless connections (via an Ethernet cable or via a WiFi, Bluetooth, Zigbee, etc. type radio channel) with the terminals of the local network and with the wide area Internet network (1). An Ethernet cable is advantageously capable of conveying higher data rates than WiFi in order to supply the user with high quality content.

The module TCOM, which performs the control method of the invention, may be a software module and/or a hardware module. It is capable in particular of performing the actions described with reference to FIGS. 1 and 5: connecting the TV (of the connected type), receiving a command from its native remote control, adapting that command for streaming access, e.g. using the MPEG-DASH standard (and under such circumstances, accessing the manifest file for presenting content, for selecting content proposed as a function of the received command, and for extracting the pertinent address), and sending the streaming command over the WAN.

In particular, a portion of the memory MEM contains, in association with the control method, a set of tables or files (e.g. MPEG-DASH manifest files and conversion tables as mentioned above) that enable the command received from the native remote control ("P+") to be converted into an understandable streaming command (requesting the program CH2 that is the next program after the program CH1).

The gateway (3) also includes an HTTP type communications module for providing http type communications with the local network and with the content server and also a media player (MP) capable of playing back (receiving, decoding, preparing) streaming mode streams and of delivering them to the playback device (TV); amongst other things, the media player includes a set of decoders (audio, video, etc.) suitable for decoding the multimedia contents.

Figure 4:
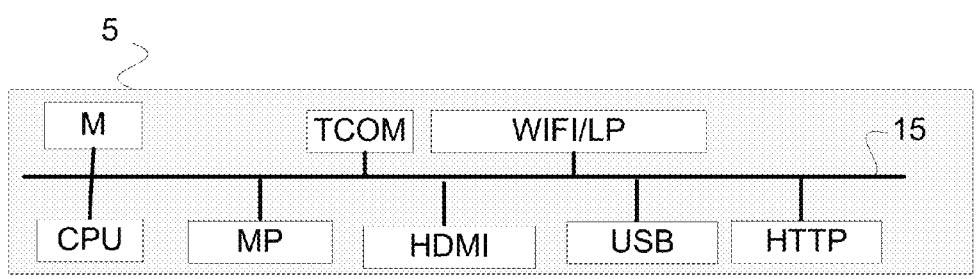
FIG. 4 shows the hardware architecture of an electronic key including a control device in another embodiment of the invention.

FIG. 4 shows the hardware architecture of a device hosting a control module in a second embodiment of the invention, e.g. the electronic key corresponding to the transfer device (5) of FIG. 2.

Figure 6:
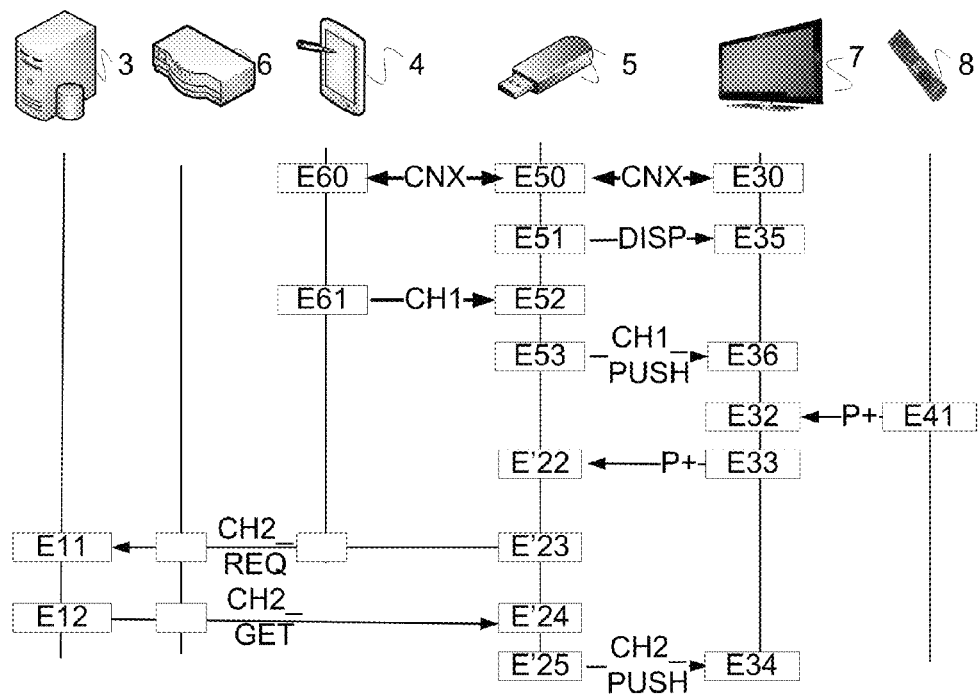
FIG. 6 is a timing diagram showing exchanges between a control device on an electronic key and a TV in another implementation of the invention.

This device likewise has memories (M) arranged around a processor (CPU). It communicates with the local network (1) via the WiFi/LP communication module that enables it to connect, preferably wirelessly (via a WiFi, Bluetooth, Zigbee, etc. type radio channel) with the terminals of the network and in particular with the mobile device (4). It is powered by a universal serial bus (USB) type interface. It also comprises:

a module providing an interface with the playback device (HDMI) capable of interfacing physically and logically with the TV in order to transmit the decoded multimedia content (audio and video), to exchange basic commands coming from the remote control of the TV (program up "P+", program down "P−", mute, volume up "vol+", volume down "vol−", etc.);

a control module of the invention (TCOM) for managing the control of streaming in the same manner as in the embodiment described above with reference to FIG. 2 (and in compliance with the implementation of FIG. 6). In the invention, this module is capable in particular of taking control of the TV in HDMI, of receiving a command from the TV in compliance with the HDMI-CEC standard, from its native remote control, of adapting the command for streaming access, e.g. using the MPEG-DASH standard, of receiving commands for controlling playback from the mobile device acting as a remote control, of sending it identification, state, etc. information, and of managing conflicts between the two types of remote control that are connected thereto, i.e. the mobile device and the native remote control, and then obtain a stream of content identified by its identifier on the network, the stream passing via the service gateway (6);

a media player (MP) capable of playing back (receiving, decoding, preparing, the streams received in streaming mode and of delivering them to the playback device (TV); the media player comprises among other things a set of decoders (audio, video, etc.) suitable for decoding the multimedia contents, and also an interface for communicating with the mobile device and suitable for interpreting orders coming therefrom; and an HTTP type communication module for providing HTTP type communication, e.g. of the websocket (WS) type so as to provide bidirectional exchanges between the two devices; it should be observed that it is possible to perform WS type communication over a Bluetooth link.

Figure 5:
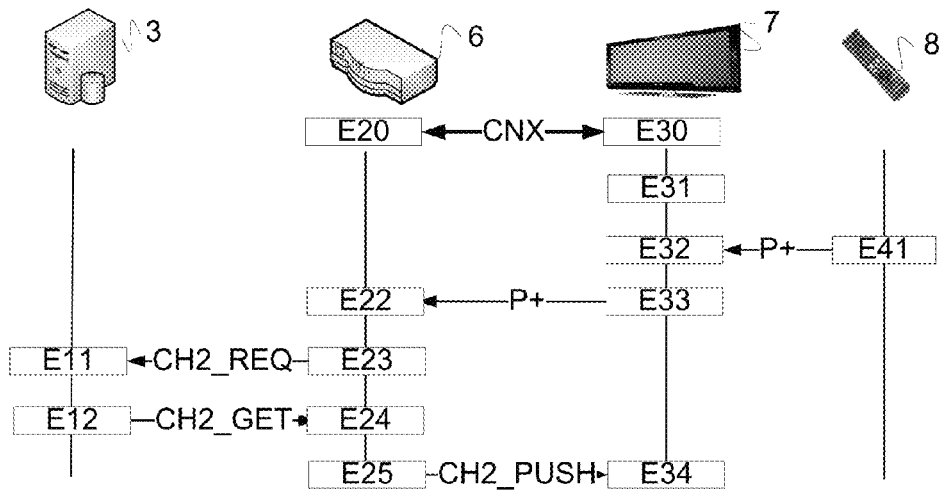
FIG. 5 is a timing diagram of exchanges between a control device on a home gateway and a TV in an implementation of the invention.

FIG. 5 is a timing diagram of exchanges between a playback device (TV, 7) that is remotely controllable by a native remote control (8) and that is suitable for communicating via an IP connection (WiFi, Bluetooth, Ethernet, etc.) with a service gateway (6).

During a first stage of preliminaries (steps E20, E30) that are necessary for performing prerequisites of the invention, the television connects to the service gateway via an IP connection (WiFi, Bluetooth, etc.), or via an HDMI connection.

With both devices connected, the host module on the home gateway takes control of the TV, e.g. by causing information to be displayed about the contents available in streaming from a content server (3). This taking of control causes the TV to switch into a "progressive downloading" mode in which all of the commands received from the native remote control are interpreted as streaming commands.

It is assumed that the user is viewing a first content streamed on channel 1 (E31, CH1). By way of example, the user may have selected this channel using the remote control, or it may be a program by default. The control device is then capable, in a step E32, of receiving basic commands selected on the native remote control (8) via its connection to the TV ("P+", "P−", channel, language, subtitles, etc.).

In this example, the user uses the remote control in order to select reception of the next program up in streaming, e.g. a channel "CH2". This program is selected via a button of the remote control in step E41, e.g. the button "P+", and it is forwarded to the TV via the gateway during a step E33.

The control module in the gateway then receives the "P+" command informing it that the user seeks to move on to the next program up.

During a reception step E22 on the gateway, the "P+" command is formatted. Alternatively, it may be formatted beforehand if the control module is in the connected TV. For this purpose, the service gateway (6) accesses the manifest file and then generates a new address for the content server. The HTTP streaming request (CH2_REC) for the next program CH2 after the current program CH1 may be as follows, in compliance with the MPEG-DASH example file provided in Appendix 1:

HTTP://server.com/CH2_FR/C1_500kb_1.m4s e.g. to indicate that the streaming device is now to receive the program "CH2" from the server "server" with the sound track in French (FR) and at a data rate of 500 kb/s.

This request is generated during a step E23, and then transmitted to the content server (3) that receives it during the step E11.

The media player (MP) receives in return the content coming from the content server (3) during a step E24, decodes it, formats it, and causes it to be played back progressively as it is received, transmitting it to the associated playback device (TV, E25).

In another example, which is not limiting, it may receive a command "LG_EN" indicating that the language should be changed, and thus requiring the English sound track to be obtained for the film that is being viewed.

If the content is protected (as can happen with VOD or with "live" content), the usual digital rights management (DRM) mechanisms may be operated without thereby going beyond the ambit of the invention.

FIG. 6 is a timing chart of exchanges between a control device on the electronic key ("dongle", 5) that is connected to the HDMI port of the TV, in another implementation of the invention and in the context described with reference to FIG. 2.

During a first stage of preliminaries (E50, E30) necessary for performing prerequisites of the invention, the "dongle" is connected to the HDMI port of the TV and it takes control of the connection. Optionally it presents it with a list of attributes: type of hardware, manufacturer name (vendorName), model (modelName), hardware/software version (hardwareVersion, softwareVersion), serial number (serialNumber), etc.

During another stage of preliminaries (E50, E60) needed for performing prerequisites of the invention, the "dongle" is connected to the mobile device that controls it. It may communicate via the local network or via a dedicated communication channel.

With the two devices connected together, the key takes control of the TV (step E51) and causes information to be displayed about the contents available for streaming on the TV (E35). By way of example, the electronic key displays a welcome menu if no other device is active on the HDMI input of the TV (DVD, SAT DVB, etc.). If a program is already active on the TV, the HDMI key does nothing. In another example, on receiving a URL from the mobile device, the electronic key takes control of the HDMI input for the purposes of playing back the content on the TV.

As from this instant, the TV is put into a "progressive downloading" mode in which all of the commands received from the native remote control are interpreted as streaming commands.

It is assumed that the user selects a program (CH1, E61), e.g. a television channel, by using an electronic program guide application (EPG) on the mobile device. The user selects to transfer the audiovisual stream of this program to the "dongle" that is connected to the TV. This selection may be implemented by selecting a button on the screen of the mobile device, the button being shown next to the program CH1, by a voice command, by pressing a keyboard key, etc. The choice of program (CH1) gives rise to the mobile device (E61) sending an identifier (CH1) for the selected content, e.g. a number, or an address of a video stream to be downloaded. In this implementation, since the transfer device is very simple, an address of the content is transmitted in the form of a URL and it is received during a step E52. In a variant, and in particular if the transfer device has appropriate hardware and software means, the received address may be modified prior to accessing the content (e.g. by introducing additional parameters).

The control module in the key then acts during a step that is not shown to generate an HTTP request for channel 1, similar to that sent previously by the gateway (CH1_REC), transmits this command to the service gateway, which transfers it to the content server, and then the key recovers the stream, which it plays back on the TV during a step E36.

The continuing operation of the method can be transposed directly from the above-described figure by replacing the control module in the gateway with the control module in the key and/or the mobile device controlling it. Specifically, depending on its capabilities, the key may host part or all of the control module, with the remainder being in the mobile device.

E32, E33: transmitting a basic command from the native remote control via the HTMI-CEC connection to the key ("P+", "P−", channel, language, subtitles, etc.);

E'23: generating a complete streaming address for the content server. For example, if the user has selected to change to the next program up, the URL may be in the form:

HTTP://server.com/CH2_FR/C1_500kb_1.m4s

In a first variant, generation is performed by the electronic key itself; this variant assumes that the key has sufficient hardware and software means to be able to receive the binary information from the HDMI-CEC command, to interpret it by consulting the conversion table (as a function in particular of the type of TV, as described above), to access the manifest file, and to analyze it and generate the correct address corresponding to the received command.

In a second variant (not shown), generation takes place on the mobile device; this variant assumes that the key does not have its own means suitable for generating the streaming address, and that it transmits the binary code ("0010") of the command it has received to the mobile device together with its interpretation ("program up", depending in particular on the type of TV), and that in return it receives the streaming address from the mobile device. Under such circumstances, it is the mobile device that accesses the manifest file and that generates the address corresponding to the received command.

Transmitting the request to the content server via the service gateway (E'23, E11) and the media player (MP) of the key receiving the content in streaming (E'24) from the content server (3); the MP decodes, formats, and plays back the content on the playback device (TV) with which it is associated via the HDMI link, progressively as it receives that content.

In this context, it should be observed that conflicts may arise between the two remote controls (e.g. the electronic key receives two URLs for different contents). In order to avoid conflicts of this type, a time period is defined (e.g. three seconds) and stored by the control device of the invention. For example, while receiving a first command from the native remote control, a timer is started with the selected time period. If a second command is received by the mobile device remote control before the time measured by the timer has elapsed (i.e. within the three second time interval), the second command is not interpreted by the control device.

Specifically, during an optional step (not shown), the transfer device can also receive commands coming from the mobile device that is transformed for this purpose into a remote control. For example, it may request switching down one program ("P−"). Under such circumstances, it is preferable to give priority to commands coming from the native remote control, which is necessarily in the same room as the TV.

At the end of the streaming session (end of the film, etc.), the application on the transfer device stops and releases the HDMI connection if no more content is expected. The transfer device leaves progressive downloading mode in which it was previously operating and is ready once more to receive a new command from the mobile device.

Naturally, the above-described embodiments and implementations are given purely by way of non-limiting indication and numerous modifications may easily be made by the person skilled in the art without thereby going beyond the ambit of the invention.

In particular, they may easily be transposed to the situation in which the mobile device (4) is acting as the access point to the network in a tethering mode. Under such circumstances, the mobile device takes the place of the service gateway (6), but the exchanges remain unchanged.

APPENDIX 1 simplified example of an MPEG-DASH manifest file

<?xml version="1.0"?>
<MPD xmlns:xsi="http://www.w3.org/2001/XMLSchema-instance"
xmlns="urn:mpeg:DASH:schema:MPD:2011"
xsi:schemaLocation="urn:mpeg:DASH:schema:MPD:2011 DASH-MPD.xsd"
type="dynamic"
profiles="urn:mpeg:dash:profile:isoff-live:2011">
<Representation id="0" codecs="avc1"
mimeType="video/mp4"
width="1024" height="768" startWithSAP="1"
bandwidth="46986">
<BaseURL>HTTP://server.com/</BaseURL>
<!-- Content C1 of CH1-->
- <Segment-List duration="10">
- <SegmentURL media="CH1_FR/C1_500kb_1.m4s"/>
- <SegmentURL media=" CH1_FR/C1_500kb_2.m4s"/>
- ... .
</SegmentList>
- <!-- Content C2 of CH1-->
- <SegmentList duration="10">
- <SegmentURL media=" CH1_FR/C2_500kb_1.m4s "/>
- ... .
</SegmentList>
- <!-- Content C1 of CH1 at a higher rate -->
- <SegmentList duration="10">
- <SegmentURL media="CH1_FR/C1_2500kb_1.m4s"/>
- ... .
</SegmentList>
- <!-- Content C1 of CH1 in English -->
- <SegmentList duration="10">
- <SegmentURL media="CH1_EN/C1_500kb_1.m4s"/>

APPENDIX 1-continued simplified example of an MPEG-DASH manifest file

- ... .
- </SegmentList>
- <!-- Content C3 of CH2 in English -->
- <SegmentList duration="10">
- <SegmentURL media="CH2_FR/C3_500kb_1.m4s"/>
- ... .
- </SegmentList>
- </MPD>

The invention claimed is:

1. A method of controlling the playback of a digital content available in a progressive downloading mode from a content server in a wide area communication network, said content being accessible via at least one service gateway and being capable of being downloaded to be played back on at least one playback device suitable for communicating with the service gateway and having a native remote control device configured to control playback on contents coming from a broadcast network, the method comprising the following acts performed by a control module in a home network of the service gateway:
receiving, from the playback device, data relating to a command selected on the native remote control device;
putting the playback device into a progressive download mode;
putting the received data into correspondence with the progressive downloading request that is to be generated;
analyzing a description file of a digital content to determine a downloading address from said correspondence;
from said downloading address, generating a request for progressively downloading a digital content associated with the selected command; and
sending the progressive downloading request to the content server via the service gateway.

2. The method of controlling the playback of a digital content according to claim 1, wherein, when generating the progressive downloading request, requesting a quality of service level.

3. The method of controlling the playback of a digital content according to claim 1, further comprising:
in a given time period, receiving data relating to a second command relating to a digital content and coming from a remote control device distinct from the native remote control device;
giving priority to one of the commands; and
adapting the generated progressive downloading request in order to take account of this priority.

4. A device for controlling within a home network of a service gateway playback of a digital content available in a progressive downloading mode from a content server in a wide area communication network, said content being accessible via the service gateway and being capable of being downloaded to be played back on at least one playback device suitable for communicating with the service gateway and having a native remote control device configured to control playback on contents coming from a broadcast network, the playback control device comprising:
a receive module for receiving from the playback device data relating to a command selected on the native remote control device;
a module for putting the playback device into a progressive download mode, putting the received data into correspondence with the progressive downloading request that is to be generated, analyzing a description file of a digital content to determine a downloading address from said correspondence, and from said downloading address, generating a request for progressively downloading a digital content associated with the selected command; and
a send module for sending the progressive downloading request to the content server via the service gateway
wherein at least one of the receive module, the module for acting to generate, or the send module is implemented at least on part by hardware.

5. The playback control device according to claim 4, wherein the receive module includes an Internet Protocol (IP) type communication interface.

6. A service gateway including the playback control device according to claim 5.

7. A system comprising a connected TV having the native remote control and the service gateway according to claim 6.

8. The playback control device according to claim 4, wherein the receive module includes an High-Definition Multimedia Interface (HDMI) type communication interface.

9. A connected TV including the playback control device according to claim 4.

10. An electronic dongle key comprising:
a playback control device configured to control playback of a digital content available in a progressive downloading mode from a content server in a wide area communication network, said content being accessible via at least one service gateway and being capable of being downloaded to be played back on at least one playback device suitable for communicating with the service gateway over a home network of the service gateway and having a native remote control device configured to control playback of contents coming from a broadcast network, the playback control device being configured comprising:
a receive module comprising a High-Definition Multimedia Interface (HDMI) type communication interface for receiving from the playback device data relating to a command selected on the native remote control device;
a module for putting the playback device into a progressive download mode, putting the received data into correspondence with the progressive downloading request that is to be generated, analyzing a description file of a digital content to determine a downloading address from said correspondence, and from said downloading address, generating a request for progressively downloading a digital content associated with the selected command; and
a send module for sending the progressive downloading request to the content server via the service gateway.

11. A system comprising a TV having the native remote control, the service gateway, a secondary remote control, and the electronic key according to claim 10.

12. A non-transitory computer-readable medium comprising a computer program stored thereon, which includes code instructions for performing a method of controlling playback of a digital content, when the program is executed by a processor, the digital content being available in a progressive downloading mode from a content server in a wide area communication network, said content being accessible via at least one service gateway and being capable of being downloaded to be played back on at least one playback device suitable for communicating with the service gateway and having a native remote control device configured to control playback on contents coming from a broadcast network, wherein the method comprises performed by a control module in a home network of the service gateway:
- receiving, from the playback device, data relating to a command selected on the native remote control device;
- putting the playback device into a progressive download mode;
- putting the received data into correspondence with the progressive downloading request that is to be generated;
- analyzing a description file of a digital content to determine a downloading address from said correspondence;
- from said downloading address, generating a request for progressively downloading a digital content associated with the selected command; and
- sending the progressive downloading request to the content server via the service gateway.

\* \* \* \* \*